(12) United States Patent
Nagashima et al.

(10) Patent No.: US 7,714,477 B2
(45) Date of Patent: May 11, 2010

(54) STATOR OF ROTATING ELECTRIC MACHINE AND STRUCTURE THEREOF

(75) Inventors: Hideaki Nagashima, Kasumigaura (JP); Ryoichi Shiobara, Hitachi (JP); Takahiko Sano, Hitachi (JP); Hirohide Murayama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 21 days.

(21) Appl. No.: 11/655,204

(22) Filed: Jan. 19, 2007

(65) Prior Publication Data
US 2007/0210674 A1    Sep. 13, 2007

(30) Foreign Application Priority Data
Mar. 13, 2006    (JP)    .............................. 2006-066881

(51) Int. Cl.
*H02K 1/18*    (2006.01)
(52) U.S. Cl. ............................... 310/216.129; 310/431; 310/433
(58) Field of Classification Search ................. 310/258, 310/254, 216.129, 419–420, 422–423, 427, 310/431–433
See application file for complete search history.

(56) References Cited

U.S. PATENT DOCUMENTS

| | | | | |
|---|---|---|---|---|
| 2,489,109 | A * | 11/1949 | Shildneck et al. ............. | 310/57 |
| 4,469,973 | A * | 9/1984 | Guyot et al. ................ | 310/433 |
| 4,837,471 | A * | 6/1989 | Kostoss et al. ................ | 310/89 |
| 5,023,501 | A * | 6/1991 | Zimmermann .............. | 310/432 |
| 6,448,686 | B1 * | 9/2002 | Dawson et al. .............. | 310/254 |
| 6,775,900 | B2 * | 8/2004 | Dawson et al. ................ | 29/596 |
| 2002/0070629 | A1 * | 6/2002 | Dawson et al. .............. | 310/258 |

FOREIGN PATENT DOCUMENTS

| | | |
|---|---|---|
| JP | 58-006658 | 1/1983 |
| JP | 58-222747 | 12/1983 |
| JP | 63-063725 | 3/1988 |

* cited by examiner

*Primary Examiner*—Quyen Leung
*Assistant Examiner*—Naishadh N Desai
(74) *Attorney, Agent, or Firm*—Antonelli, Terry, Stout & Kraus, LLP.

(57) ABSTRACT

In a stator core support structure in a conventional rotating electric machine, it has been difficult to set the circumferential and radial stiffnesses with which elastic bars support a stator core, to appropriate values in view of a relationship between transmission of torque and vibration prevention. In order to solve the above problem, sectional shape of elastic support bars is formed as rectangular, elliptic, rhombic or the like, and accordingly, the ratio between circumferential and radial stiffness of the elastic support bars can be changed.

3 Claims, 6 Drawing Sheets

STATOR OF ROTATING ELECTRIC MACHINE AND STRUCTURE THEREOF

BACKGROUND OF THE INVENTION (1) Field of the Invention

The present invention relates to a stator used in a rotating electric machine, and in particular to a structure for supporting a stator core to a stator frame.

(2) Description of Related Art

As to a structure (which will be hereinafter occasionally referred to as a stator core support structure) for supporting a stator core to a stator frame in the rotating electric machine as stated above, for example, JP-A-58-006658 discloses the provision of a columnar pressure transmission rod for absorbing vibrations.

Further, JP-A-58-222747 discloses a structure capable of using a loose-jointed bolt for fixing a spring bar in the stator frame with a reamer bolt in view of such a fact that the spring bar can be fixed in the stator frame without the necessity of a high degree of positioning accuracy.

Further, JP-A-63-253840 discloses a structure such that a ring plate welded to the inside of a stator frame is fixed at its inner periphery to a key bar fitted in a key slot axially formed in the outside of the stator core by means of adjustable bolts so as to apply a radial tension to the stator core.

However, a conventional stator core support structure is such that the stator core is elastically supported by a columnar pressure transmission rod in its axial direction, that is, a pressure transmission rod having a circular cross-sectional shape is used.

Thus, a ratio between the radial and circumferential stiffness of elastic support bars (which will be occasionally referred to simply as "rod") which are arranged around the stator core cannot be changed. Thus, it has been difficult to set the circumferential and radial stiffness of the elastic support bars for supporting the stator core to values which are appropriate in view of a relationship between torque transmission and vibration prevention for the stator frame.

Further, the structure in which the spring bar is fixed to the stator frame by the reamer bolts and the structure in which the ring plate welded to the stator frame is coupled to the key bar fitted in the stator core by the adjustable bolts have caused problems in view of the assembly by fastening the bolts.

BRIEF SUMMARY OF THE INVENTION

An object of the present invention is to provide a support structure capable of setting the circumferential and radial stiffnesses of elastic rods, for supporting the stator core, to values which are appropriate in view of the relationship between the torque transmission and the vibration prevention for the stator frame.

According to the present invention, there is provided a support structure for supporting a stator core to a support frame in a rotating electric machine comprising a first ring-like support plate attached to an outer peripheral side of a stator core, a second ring-like support plate attached to an inner peripheral side of the stator frame, and support bars extended through the first ring-like support plate and the second ring-plate support plate so as to couple the first and second ring-like support plates together.

Further, it is essential that the support bar has a section having such a shape that it is larger in the circumferential direction of a stator having the stator core and the stator frame than in the radial direction thereof.

Further, the section of each of the support bars is preferably rectangular, elliptic or rhombic, and the support bar has to have elasticity.

Meanwhile, the first ring-like support plate and the second ring-like support plate have through holes through which the support bars are extended, and the section of each of the through holes may have such a shape that it is greater in the circumferential direction than in the radial direction of the stator core and the stator frame.

Further, according to the present invention, a stator of the rotating electric machine according to the present invention, comprises a stator core, a stator frame, a first ring-like support plate formed on the stator core, a second ring-like support plate formed in the stator frame, and support bars formed in the axial direction of the stator core and the stator frame, and extended through the first and second ring-like supports so as to support them.

It is noted that each of the support bars has a stiffness which is different between the circumferential direction of the stator and the radial direction thereof, and in particular, this stiffness is larger in the circumferential direction of the stator than in the radial direction thereof.

Further, the section of the support bar is larger in the circumferential direction of the stator than in the radial direction thereof.

Further, a rotating electric machine according to the present invention has the stator as stated above.

Further, the support bar may have a part having a circular sectional shape, and the rotor frame may have a third ring-like support plate having circular holes with a diameter larger than that of the circular sectional shape.

Further, there may be provided such a configuration that the first ring-like support plate and the second ring-like support plate are cut out alternately in parts between positions where the support bars are extended through.

With the above-mentioned configuration, the stator core and the stator frame are elastically coupled to each other, thereby it is possible to achieve such vibration prevention that vibration in the radial direction of the stator core is prevented from being transmitted from the stator core to the stator frame, and it is possible to change a ratio of between stiffness of the elastic support bars in the circumferential direction and the radial direction.

With the provision of the support structure according to the present invention, the circumferential and radial spring stiffness of the elastic rods supporting the stator core can be set to appropriate values in view of the relationship between the transmission of torque and the vibration prevention with respect to the stator frame.

Other objects, features and advantages of the invention will become apparent from the following description of the embodiments of the invention taken in conjunction with the accompanying drawings.

DETAILED DESCRIPTION OF THE INVENTION

Explanation will be made of embodiments of the present invention with reference to the accompanying drawings.

Embodiment 1

Figure 1:
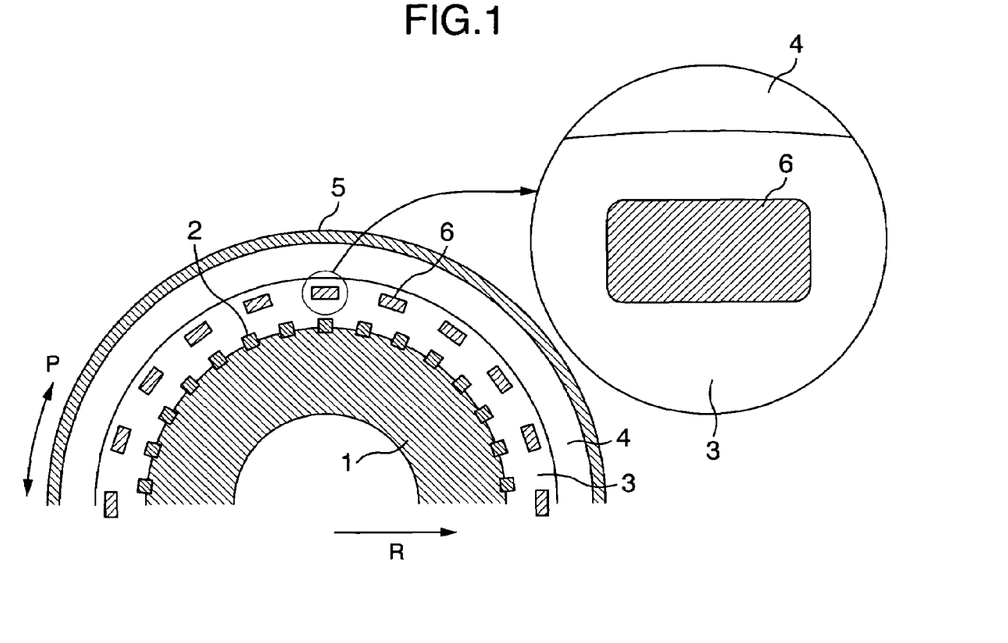
FIG. 1 is a sectional view illustrating an upper half of a stator support structure in a first embodiment of the present invention, cut in a plane orthogonal to the axial direction thereof.
Figure 2:
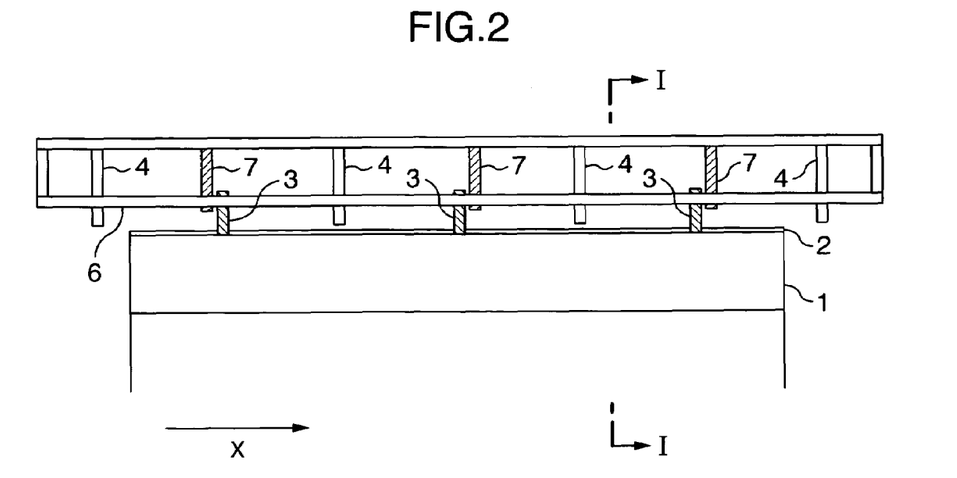
FIG. 2 is a vertical sectional view illustrating the upper half of the stator core support structure in the first embodiment of the present invention, cut along the center axis thereof.

FIGS. 1 and 2 show a stator in an embodiment of the present invention. FIG. 1 is a sectional view cut along line A-A' in FIG. 2, and FIG. 2 is a sectional view which shows an upper half of a stator core support structure in a rotating electric machine, which is vertically cut along the center axis thereof.

Key bars 2 are formed on the outer periphery of a stator core 1 which is formed by axial lamination, in the axial direction X, being fitted in key slots.

Further, the stator core 1 is formed with first ring-like support plates (the stator core side: first ring-like support plates) 3 adapted to be attached to the outer surface of the stator core in the circumferential direction, and a stator frame 5 is formed therein with second ring-like support plates (the stator frame side: the second ring-like support plates) 4 adapted to be attached to the inner surface of the stator frame 5 in the circumferential direction.

Elastic support bars 6 arranged around the stator core 1 are axially extended through the first ring-like support plates 3 and the second ring-like support plates 4, and are then fixed to the first ring-like support plates 3 and the second ring-like support plates 4 in order to elastically couple the stator core 1 with the stator frame 5 so as to constitute such a structure that radial vibration of the stator core 1 is prevented from being transmitted to the stator frame 5.

The sectional shape of each of the elastic support bars 6 offers different stiffnesses in the radial direction R and the circumferential direction P, which can be changed. In this embodiment, the support bars 6 have a rectangular sectional shape.

It is noted that the sectional shape of each support bar 6 has rounded four corners, and accordingly, although it is not an exact mathematical rectangular shape, the rectangular shape in this embodiment may include such a rectangular shape having rounded four corners.

The ratio of circumferential and radial stiffness can be adjusted by a ratio between a long side and short side of each of the elastic support bars 6 arranged around the stator core 1, and the circumferential and radial stiffness of the elastic support bars 6, for supporting the stator core 1 can be set to appropriate values in view of a relationship between the transmission of torque and the vibration prevention.

It is noted that the stator core 1 has s configuration in which steel plates are axially stacked one upon another.

The support structure for supporting the stator core 1 to the stator frame 5 in the rotating electric machine in this embodiment comprises the first ring-like support plates 3 attached to the outer peripheral side of the stator core 1, the second ring-like support plates 4 attached to the inner peripheral side of the stator frame, and the support bars 6 extended through the first ring-like support plate 3 and the second ring-like support plate 4 so as to couple them.

Thus, with the above-mentioned structure, the section of each of the support bars 5 has such a shape that it is greater in the circumferential direction than in the radial direction of the stator having the stator core 1 and the stator frame 5.

It is noted that the first ring-like support plates 3 and the second ring-like support plates 4 have through holes through which the support bars 6 are extended. The section of each of the through holes may have such a shape that it is greater in the circumferential direction than in the radial direction.

Further, as shown in FIGS. 1 and 2, the stator of the rotating electric machine in this embodiment has the stator core 1, the stator frame 5, the first ring-like support plates 3 formed on the stator core 1, the second ring-like support plates formed in the stator frame 5, and the support bars 6 formed in the axial direction of the stator core 1 and the stator frame 5, and extended through the first ring-like support plates 3 and the second ring-like support plates 4 so as to support them.

Each of the support bars 6 may have different stiffnesses in the radial and circumferential directions of the stator having the stator core 1 and the stator frame 5, and in particular, the rigidity in the circumferential direction of the stator may be set to be greater than that in the radial direction.

Further, although not shown, the rotating electric machine in this embodiment utilizes the above-mentioned stator.

Embodiment 2

Figure 3:
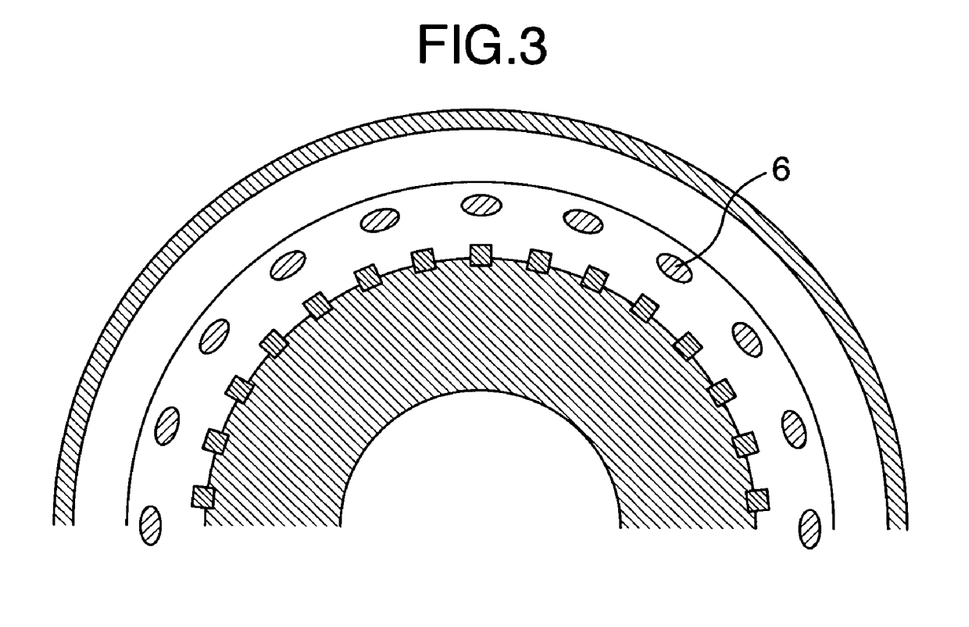
FIG. 3 is a sectional view illustrating an upper half of a stator core support structure in a second embodiment of the present invention, cut in a plane orthogonal to the axial direction thereof.

FIG. 3 shows another embodiment of the present invention.

There are shown elastic support bars 6 having an elliptic sectional shape.

Even in this embodiment, the adjustment to the ratio between the circumferential and radial stiffness can be made by a ratio between the major and minor axes of each of the elastic support bars 6 which are arranged around the stator core 1. The stiffness of the elastic support bars can be set to appropriate values in view of a relationship between transmission of circumferential and radial torques for supporting the stator core 1, and vibration prevention.

Embodiment 3

Figure 4:
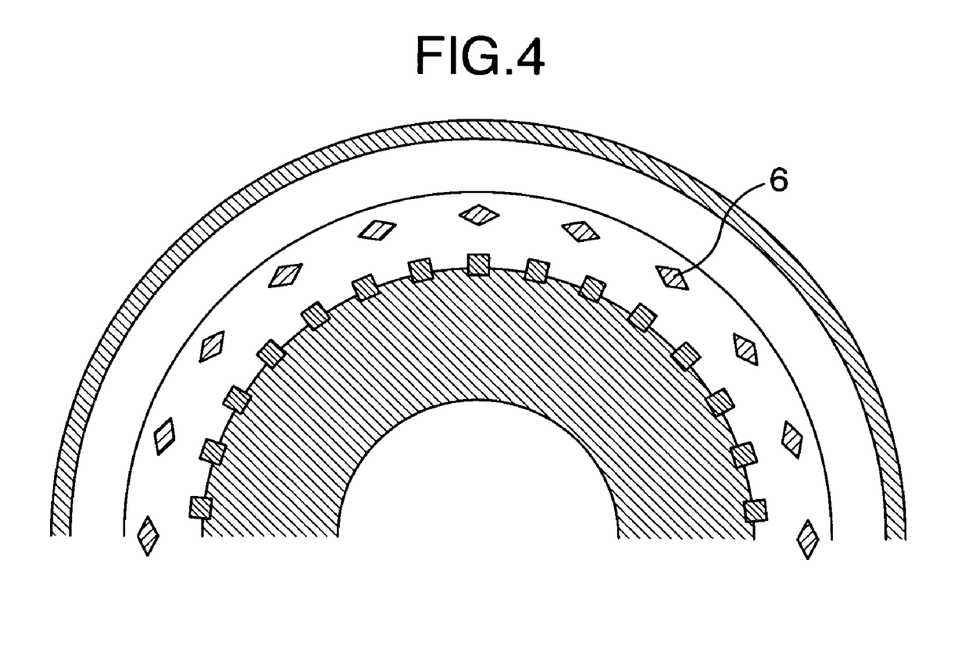
FIG. 4 is a sectional view illustrating an upper half of a stator core support structure in a third embodiment of the present invention, cut in a plane orthogonal to the axial direction thereof.

FIG. 4 shows another embodiment of the present invention.

There are shown resilient support bars 6 having a rhombic sectional shape.

Even in this embodiment, the ratio between the circumferential and radial stiffness can be adjusted by a ratio between the major and minor axes of elastic bars 6 arranged around the stator core 1. The stiffness of the elastic support bars 6 can be set to appropriate values in view of a relationship between transmission of circumferential and radial toques for supporting the stator core 1, and vibration prevention.

Embodiment 4

Figure 5:
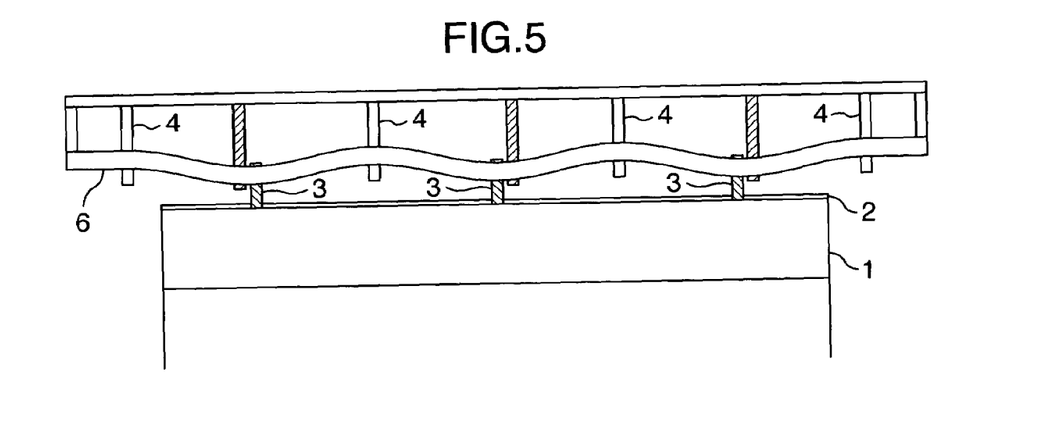
FIG. 5 is a sectional view illustrating an upper half of a stator core support structure, for explaining a mode in which a support bar is deformed by vibration.
Figure 6:
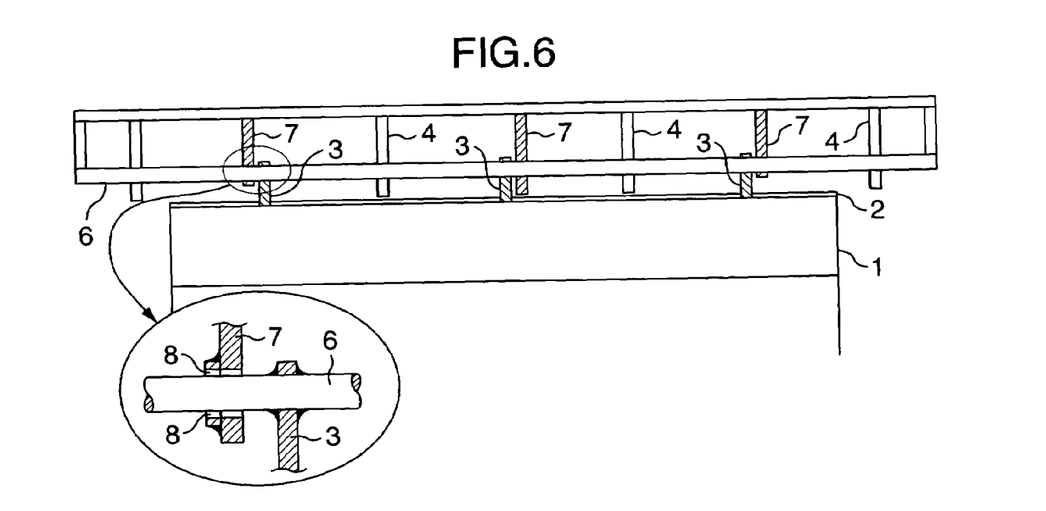
FIG. 6 is a sectional view illustrating an upper half of a stator core structure, cut in a plane orthogonal to the axial direction thereof, for explaining an excessive deformation restraint portion, together with an enlarged view illustrating the excessive deformation restraint portion.

FIG. 5 is a view for explaining a deformation mode of the elastic support bar 6 in such a case that the stator core 1 vibrates, and FIG. 6 is a view for explaining a ring-like support plate 7 for restraining the support bar from being largely deformed, exceeding an allowable deformation 8 in the case of exertion of excessive vibration load.

FIG. 5 is the explanatory view which exaggeratedly shows a deformation of an excessive deformation restraint portion, which is sectioned along the center axis of the stator core 1.

During operation of the rotor, the stator core 1 vibrates so that the support bars 6 are deformed through its elasticity as shown in the figure.

FIG. 6 is an enlarged sectional view, cut in a plane orthogonal to the center axis of the stator core 1, which shows the excessive deformation restraint portion.

In the case of deformation of the elastic support bar 6 as shown in FIG. 5, the deformation can be restrained within gaps 8 which correspond to an allowable deformation of the support bar 6, and which are formed in ring-like support plates 7 (third ring-like support plates) for preventing excessive deformation shown in FIG. 6.

Thus, each of the elastic support bars 5 may have, in part, a circular sectional shape and may also have the third ring-like support plates 7 having circular holes having a diameter larger than the diameter of the above-mentioned circular sectional shape.

Such gaps 8 are required, being formed in the ring-like support plates 7.

In the case of using support bars 6 having a quadrangle, elliptic or rhombic sectional shape as the sectional shape of the elastic support bar 6, it is difficult to set gaps 8 corresponding to the allowable deformation, to a constant value in all directions.

Thus, it is preferable to have the following configuration which will be explained with reference to FIGS. 7 and 8.

Figure 7:
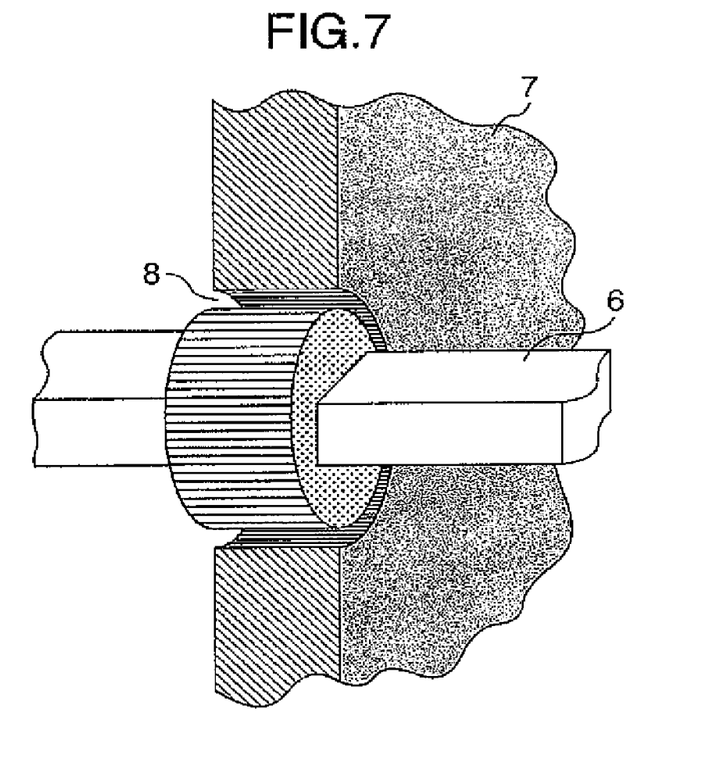
FIG. 7 is a sectional view three-dimensionally illustrating an excessive deformation restraint portion of a stator core support structure in another embodiment of the present invention.
Figure 8:
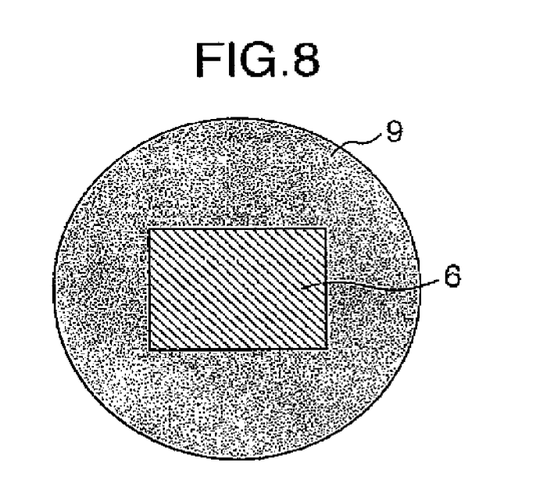
FIG. 8 is a sectional view illustrating an excessive deformation restraint portion of the stator core support structure in another embodiment of the present invention, cut in a plane orthogonal to the center axis thereof.

FIG. 7 shows a sectional part in which a part of the elastic support bar 6 having a rectangular sectional shape has a circular sectional shape. In this case, the support bar 6 may be formed thereon with a circular ring so as to have a circular cross-sectional shape in a part thereof.

With this embodiment, even though the elastic support bar 6 has a rectangular, elliptic or rhomb sectional shape, excessive deformation in an arbitrary radial direction can be restrained.

Embodiment 5

Figure 9:
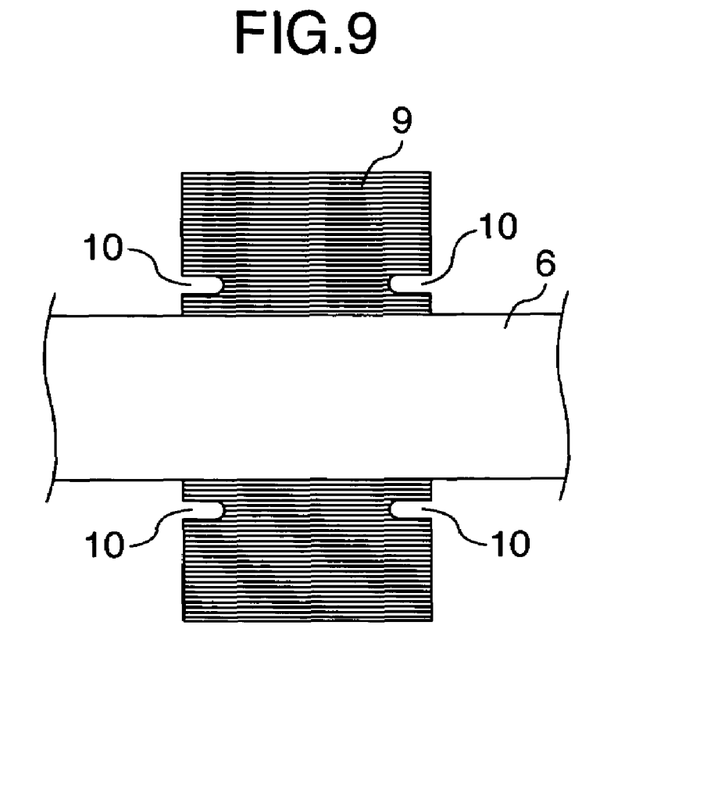
FIG. 9 is a sectional view illustrating an excessive deformation restraint portion of a stator core support structure in the other embodiment of the present invention, cut along the center axis.
Figure 10:
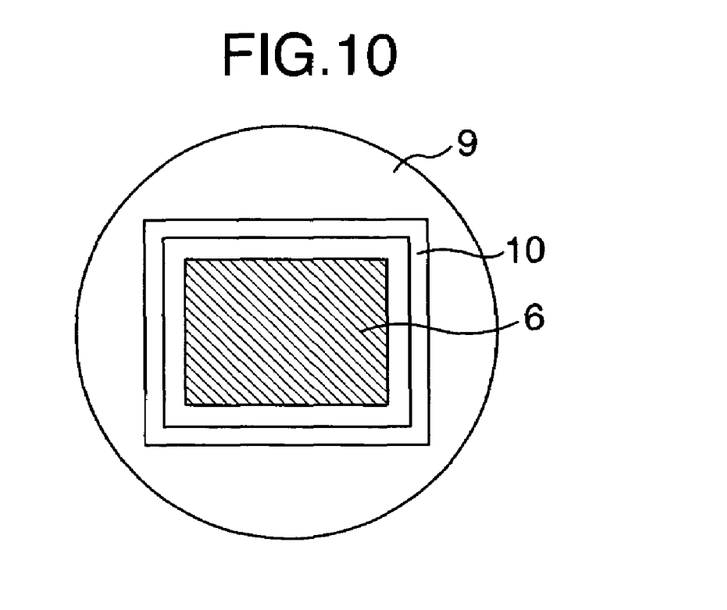
FIG. 10 is a sectional view illustrating an excessive deformation restraint portion of a stator core support structure in the other embodiment of the present invention, cut in a plane orthogonal to the center axis.

FIGS. 9 and 10 show another embodiment of the present invention.

FIG. 9 is a sectional view illustrating an excessive deformation restraint portion, cut along the center axis of the stator core, and FIG. 10 is a sectional view illustrating the excessive deformation restraint portion, cut in a plane orthogonal to the center axis of the stator core.

As the circular section part of the excessive deformation restraint portion, a sleeve 9 having a circular outer shape is inserted therein with the outside of an elastic support bar 6 having a rectangular sectional shape within a sleeve having a circular external shape.

In this case, stresses of the elastic support bar 6 having a rectangular cross-sectional shape become higher at both opposite end face parts of the sleeve 9, and accordingly, there would cause a risk of fretting failure. In such a case, U notch 10 around the circular hole to prevent fretting failure is formed.

According to this embodiment, even though the elastic support bar 6 having a rectangular, elliptic or rhombic sectional shape is used, excessive deformation in an arbitrary radial direction can be restrained without milling the support bar having a circular cross-sectional shape into a support bar having a rectangular, elliptic or rhombic cross-sectional shape.

Embodiment 6

Figure 11:
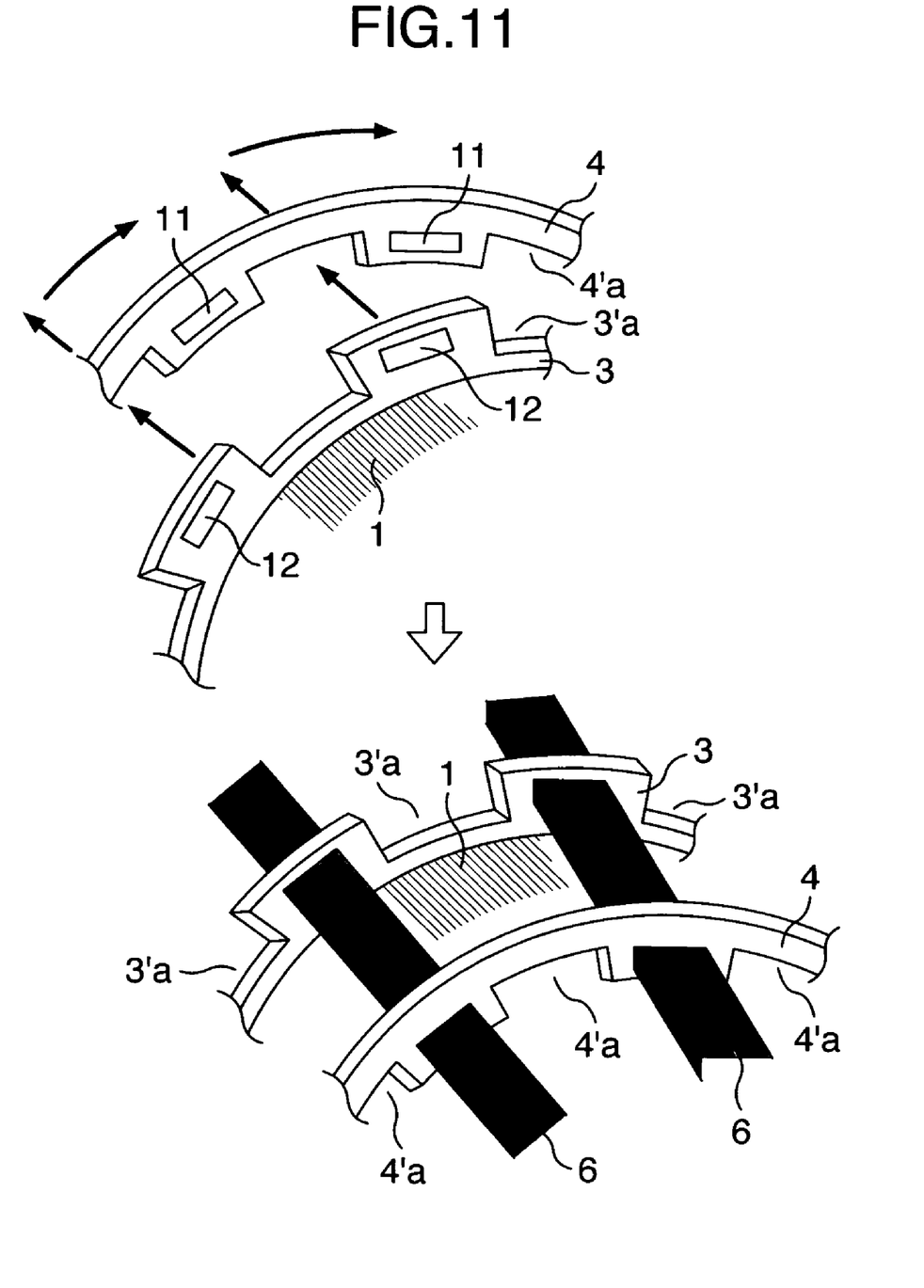
FIG. 11 is a view illustrating a stator core support structure in the other embodiment of the present invention, in which ring-like support plates are alternately cut out.

FIG. 11 shows another embodiment of the present invention.

In the upper part of FIG. 11, there is shown a second ring-like support plate 4 for the stator frame 5, having cutouts, holes 11 through which elastic support bars 6 having a rectangular sectional shape are extended, a first ring-like support plate 3 for the stator core 1, having cutouts, and holes 12 through which the support bars 6 having a rectangular sectional shape are extended.

Parts 3'a, 4'a are alternately cutout between these holes, and the second ring-like support plate 4 having cutouts in the circumferential direction of the inner surface of the stator frame 5 is attached and the first ring-like support plate 3 having cutouts in the circumferential direction of the outer surface of the stator core 1 is attached. Thereafter, the stator core 1 is inserted in the stator frame 5 in the axial direction thereof, and then, the holes 11 which are formed in the second ring-like support plate 4 having the cutouts and through which the resilient support bars 6 having a rectangular sectional shape are extended, are aligned with the holes 12 which are formed in the first ring-like support plate 3 having the cutouts and through which the elastic support bars 6 having the rectangular cross-sectional shape are extended, by rotating the stator core 1.

In the lower part of FIG. 11, there is shown such a condition that the elastic support bars 6 are extended through these holes 11, 12.

In this embodiment, even after the second ring-like support plate 4 is joined to the inner surface of the stator frame 5 while the first ring-like support plate 5 is joined to the outer periphery of the stator core 1, the stator core 1 can be inserted into the stator frame 5 in the axial direction, and, by rotating the stator core 1 after the insertion thereof, the support bars 6 can be inserted through the holes formed in the second ring-like support plate 4, for the support bars 6 and the holes formed in the first ring-like support plate 3, for the support bars 6.

That is, with such a configuration that the first ring-like support plate 3 and the second ring-like support plate 4 are alternately cut out between positions where the support bars 6 are extended through, the stator core 1 and the stator frame 5 can be elastically coupled to each other in order to obtain such vibration prevention that radial vibration of the stator core is prevented from being transmitted to the stator frame 5, and the ratio between stiffness of the support bars in the circumferential and radial directions can be changed.

Further, in view of the above-mentioned configuration, there may be materialized a rotating electric machine characterized in that the circumferential and radial stiffnesses of elastic rods can be changed.

Thus, in this embodiment, without the necessity of fastening of bolts, the ratio between circumferential and radial stiffness of the elastic support bars arranged around the stator core 1 can be adjusted with the use of the elastic support bars having a rectangular, elliptic or rhombic sectional shape, thereby it is possible to set the circumferential and radial stiffness of the support bars 6 which support the stator core 1 to appropriate values in view of a relationship between transmission of torque and vibration prevention.

The present invention can be utilized for a rotating electric machine using a stator in which a stator core is supported to a stator frame.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A support structure as vibration prevention to join a stator core to a stator frame in the rotating electric machine, comprising:

a first ring-like support plate attached to an outer peripheral side of the stator core;

a second ring-like support plate attached to an inner peripheral side of the stator frame;

a third ring-like support plate attached to one of the outer peripheral side of the stator core and the inner peripheral side of the stator frame, and support bars extending through the first ring-like support plate, the second ring-like support plate and the third ring-like support plate so as to join the stator core and the stator frame, wherein:

each of the support bars has a circular sectional shape at a portion where the support bars extend through the third ring-like support plate, and the sectional shape is selected from one of elliptic or rhombic at portions where the support bars extend through the first and second ring-like support plates, so that stiffness in the circumferential direction of the stator core is greater than that in the radial direction, and the circular sectional shape of each support bar has a diameter smaller than the hole of the third ring-like support plate to restrain the support bars from excessive deformation in an arbitrary radial direction thereof.

2. The support structure according to claim 1, wherein each of the support bars has a sleeve whose outer shape constitutes said circular sectional shape of the support bars and including grooves to prevent fretting failure around the holes into which the support bars are fitted.

3. The support structure according to claim 1, wherein outer periphery parts between holes bored in the first ring-like support plate attached to outer surface of the stator core and inner periphery parts between holes bored in the second ring-like support plate attached to inner surface of the stator frame are cut off the stator core is rotated until the cutoff parts and the holes become aligned so as to facilitate insertion of the stator core into the stator frame.

* * * * *